(12) United States Patent
Tone

(10) Patent No.: US 7,945,125 B2
(45) Date of Patent: May 17, 2011

(54) IMAGE PROCESSING DEVICE AND IMAGE PROCESSING CONTROL METHOD

(75) Inventor: Takeharu Tone, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1157 days.

(21) Appl. No.: 11/621,798

(22) Filed: Jan. 10, 2007

(65) Prior Publication Data

US 2007/0165969 A1 Jul. 19, 2007

(51) Int. Cl.
*G06K 9/54* (2006.01)
*H04N 1/40* (2006.01)

(52) U.S. Cl. ............ 382/307; 382/303; 358/448

(58) Field of Classification Search ............ 382/173, 382/302, 304, 307, 312, 303, 305; 358/1.16, 358/400, 444, 448; 713/1; 711/221
See application file for complete search history.

(56) References Cited

U.S. PATENT DOCUMENTS

| 4,817,032 A * | 3/1989 | Ohata et al. ............ 711/221 |
| 5,715,070 A | 2/1998 | Tone et al. |
| 6,633,975 B1 * | 10/2003 | Sawada et al. ............ 713/1 |
| 6,944,358 B2 * | 9/2005 | Morimoto et al. ............ 382/304 |
| 7,209,602 B2 * | 4/2007 | Kim ............ 382/302 |

FOREIGN PATENT DOCUMENTS

JP 8-274986 10/1996

* cited by examiner

*Primary Examiner* — Kanji Patel
(74) *Attorney, Agent, or Firm* — Oblon, Spivak, McClelland, Maier & Neustadt, L.L.P.

(57) ABSTRACT

An image processing device for curbing memory expansion and reducing costs while securing programming freedom by a small programmable data processing unit. A plurality of process programs and process parameters thereof, to be sequentially executed in a data processing unit, are stored beforehand in a data memory. In the data processing unit is repeated, as many times as there are process programs in the data memory, an operation in which image data to be processed are divided into plural respective divided image data as process units, and a process program, process parameters thereof and divided image data are read from the data memory, the process program is executed on the divided image data referring to the process parameters thereof, and then the divided image data after processing, the executed process program and the process parameters thereof are written back to the data memory.

14 Claims, 16 Drawing Sheets

SYSTEM CONFIGURATION EXAMPLE OF THE PRESENT INVENTION

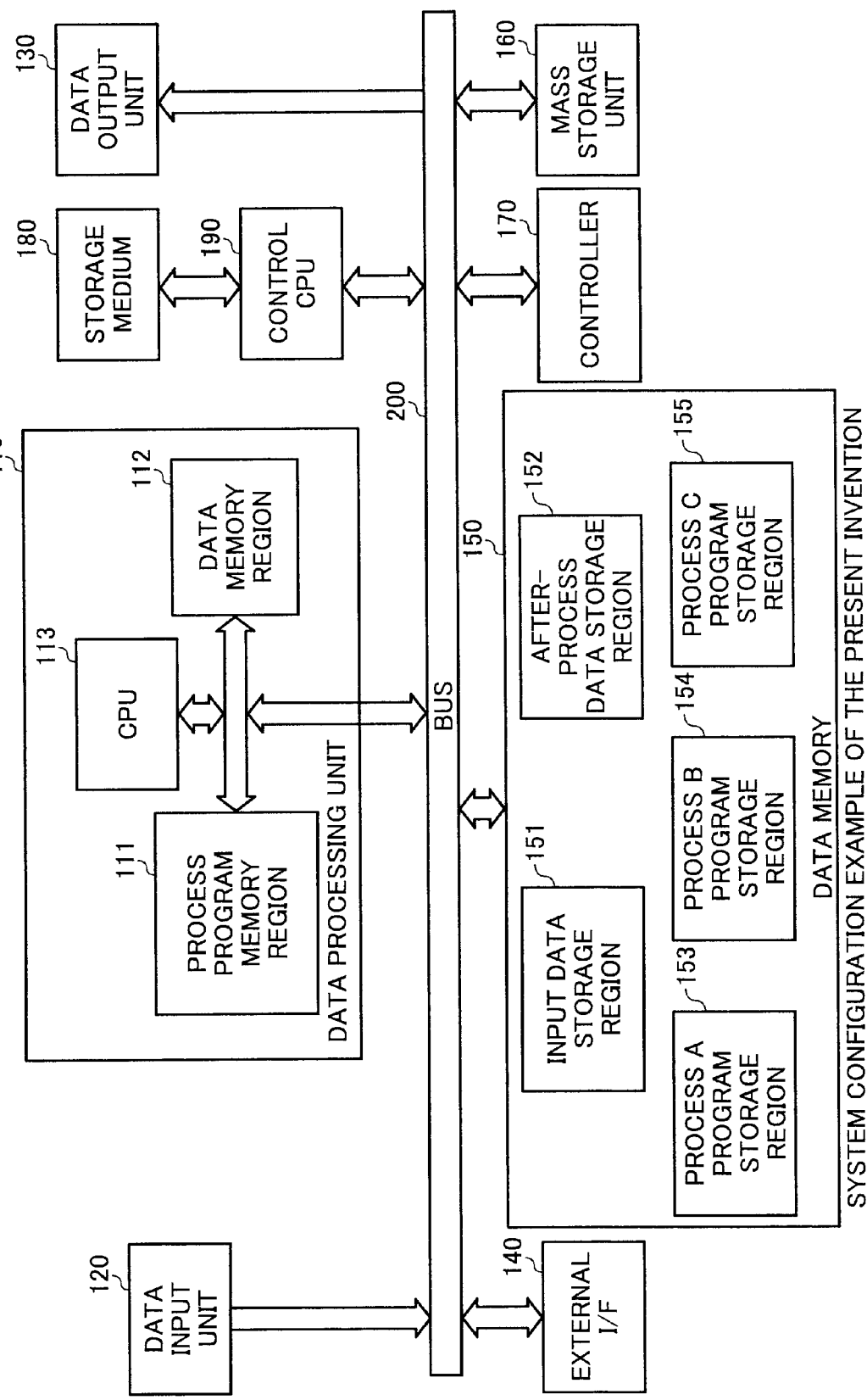

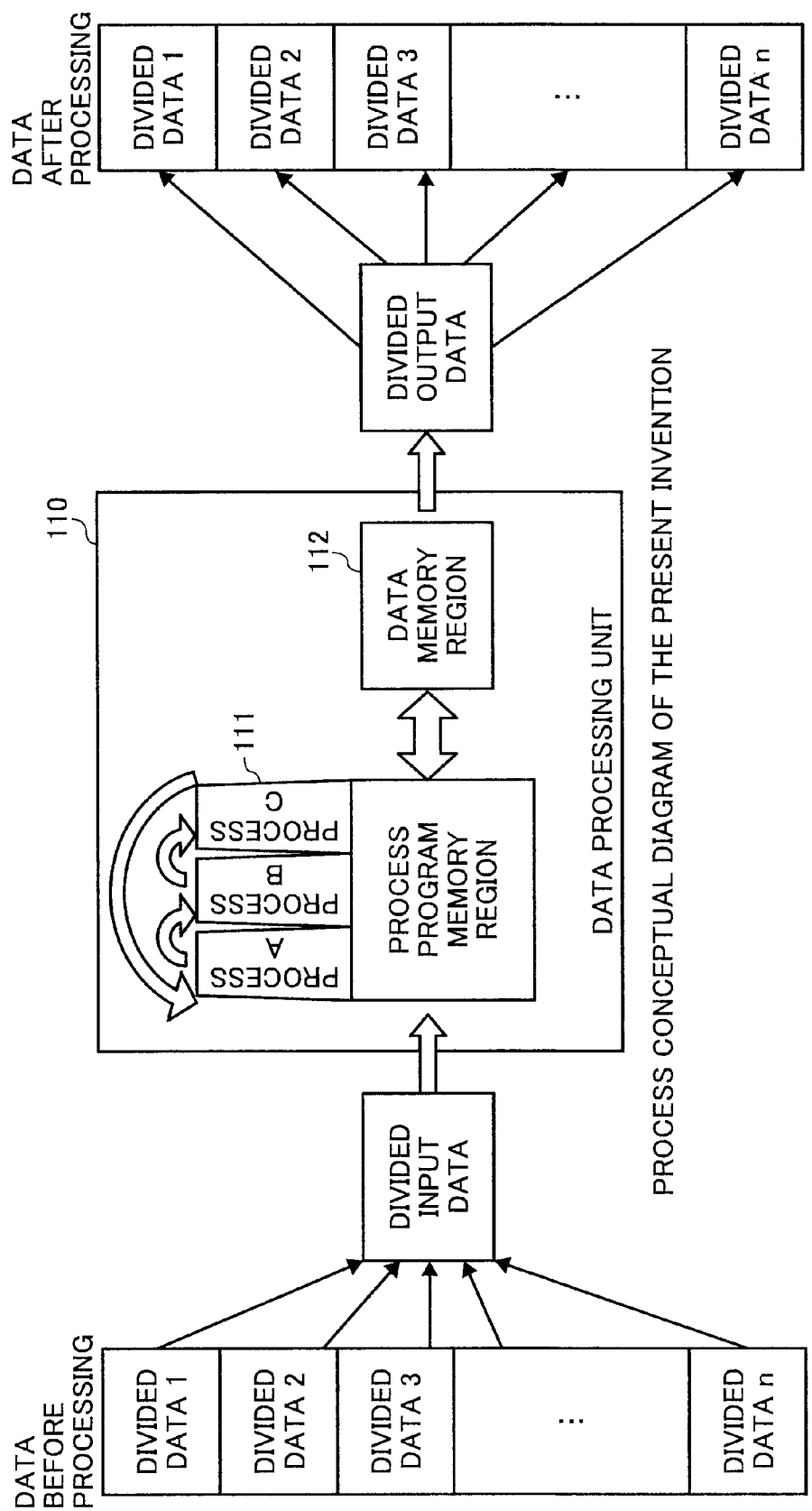

EXPLANATORY DIAGRAM FOR BOUNDARY REGIONS

PROGRAM AND DATA CONFIGURATION EXAMPLE

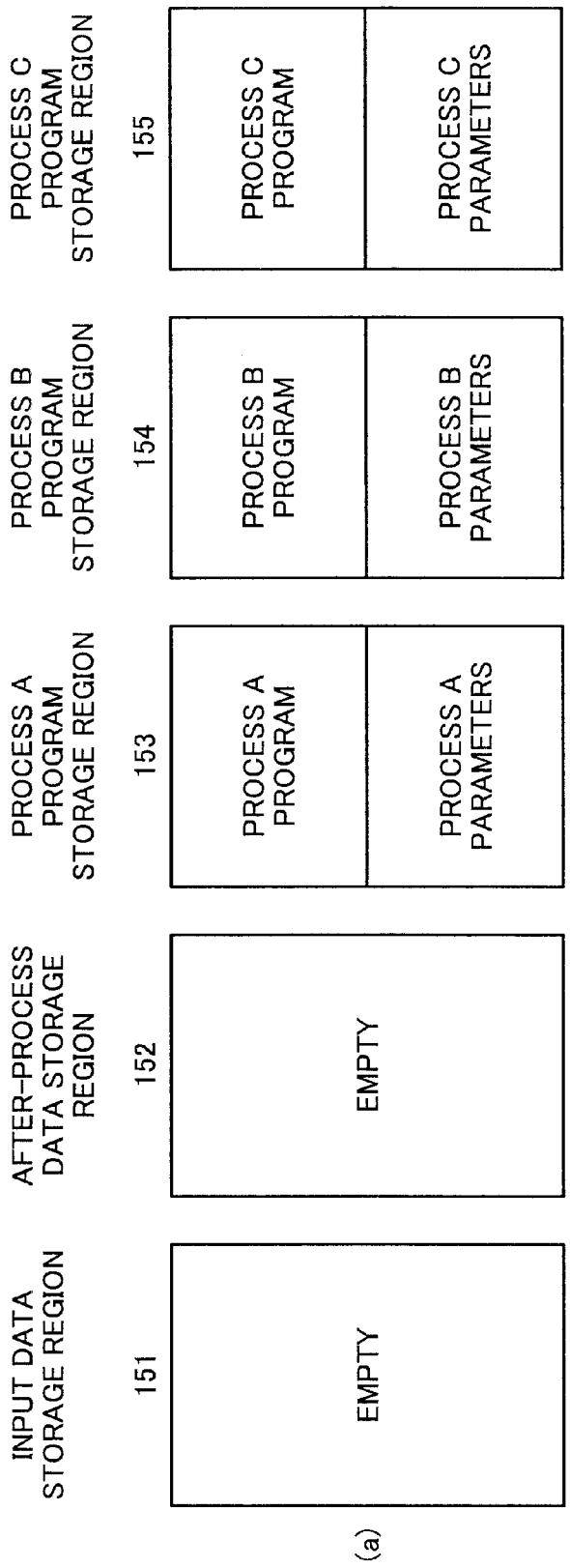

DATA MEMORY TRANSITION DIAGRAM

TIME CHART OF THE EMBODIMENT (EXAMPLE OF PROCESS A→PROCESS B FLOW)

IMAGE PROCESSING DEVICE AND IMAGE PROCESSING CONTROL METHOD

BACKGROUND OF THE INVENTION

1. Field of the Invention

The present invention relates to an image processing device and an image processing control method used in a single device such as a digital copier, a fax machine, a printer or the like, or in a multifunction peripheral (MFP) that combines part or all of the processing functions of the foregoing and/or of a scanner or the like, or in other image data processing devices.

2. Description of the Background Art

Image processing devices such as digital copiers or the like require processing functions, for instance, interline correction, shading correction, MTF (spatial frequency characteristic) filtering, gamma conversion, gradation processing and the like. A multifunction device (MFP) must combine in a single unit a copier function, a scanner function, a fax function, a printer function and the like.

Among conventional image processing devices, Japanese Patent Application Laid-open No. H08-274986 and U.S. Pat. No. 5,715,070, for instance, disclose the use of data processing hardware (ASIC) having ordinarily a plurality of independent dedicated processing units, to realize thereby plural processing functions. Using data processing hardware (ASIC) having a plurality of independent dedicated processing units is advantageous on account of the superior speed performance achieved thereby, but, on the other hand, is problematic because of lack in flexibility as regards functional modifications and/or additions, on account of hardware logic. Programmable devices such as DSPs (digital signal processors) are often used as a solution to this problem. Using a programmable device such as a DSP is advantageous in that process functions can be modified/supplemented flexibly by re-downloading the process programs to the DSP. On account of software processing, however, programmable devices are by contrast inferior to dedicated hardware logic as regards speed characteristics. Conventional programmable devices are also costly since each process requires a process program memory and data memory.

Both image processing devices using ASICs and image processing devices using DSPs have thus merits and demerits, so that ordinarily either kind is used depending on the circumstances.

Meanwhile, process flows in multifunction devices (MFP) have become more diverse and complex in recent years owing to the bolstering of copier functions, scanner functions, fax functions, printer functions and the like. A number of processing functions must thus be implemented in order to meet the diverse needs of the user. The user has also a strong demand for image quality, and hence the image processing burden tends to increase in order to cope with such high-quality image requirements. The diversification and growing complexity of process flows are not only restricted to multi-function devices, but affect equally single devices such as digital copiers, fax machines, printers and other image data processing devices.

Thus, hardware components for carrying out actual image processing, typified by ASICs, are problematic on account of their increasing size and associated higher manufacturing costs. In data processing hardware such as ASICs, in particular, process-dedicated programs and process-dedicated memories must be arranged plurally in the hardware, as described above, and hence it is difficult to realize cost cuts while preserving required process functionalities. Since process functions are realized herein through an internal hardware logic provided beforehand, such data processing hardware suffers from a fundamental drawback of being lacking in flexibility as regards functional updates and/or additions.

The biggest advantage of programmable devices such as DSPs or the like is that, although inferior to ASICs, for instance, in terms of speed characteristics and/or cost, they afford a high degree of freedom as regards programming of functions in accordance with the needs of the user, at all times. That is, process changes and/or additions can be easily implemented by programming functions to be processed, and by downloading the program code to the DSP or the like. Image processing devices using conventional programmable devices such as DSPs or the like, however, are problematic in that the latter require a program memory and a data memory for each process, and hence the scale of the DSPs or the like becomes larger upon execution of plural process functions, as described above, incurring then greater costs than ASICs or the like. Multiplication of image data, moreover, requires data memories with expanded capacity, which inevitably incurs higher costs.

SUMMARY OF THE INVENTION

An object of the present invention is to provide an image processing device and an image processing control method for curbing the need for larger memory resources, thereby reducing costs while securing programming freedom.

In an aspect of the present invention, an image processing device comprises a programmable data processing unit, an image data storing unit and a process program storage unit. The data processing unit repeats a process of dividing and reading image data from the image data storage unit, reading the process program from the process program storage unit, executing the read process program on the read image data, returning the image data after processing to the image data storage unit, and returning the process program after execution to the program storage unit, for each divided image data.

In another aspect of the present invention, an image processing device comprises a programmable data processing unit; an image data storing unit; and a storage unit of plural process programs. A first process of dividing and reading the image data from the image data storage unit, reading a first process program from the process program storage unit, executing the read first process program on the divided and read image data, returning the image data after processing to the image data storage unit, and returning the first process program after execution to the program storage unit; and a second process of sequentially repeating for each process program existing in the program storage unit a process of reading from the image data storage unit the image data after processing, reading from the process program storage unit a next process program, executing the read process program on the read image data, returning the image data after processing to the image data storage unit, and returning the process program after execution to the program storage unit, are repeated for each divided image data.

In another aspect of the present invention, an image processing control method in an image processing device, which has a programmable data processing unit, an image data storing unit, and a process program storage unit, comprises the steps of: dividing image data from the image data storage unit and loading the image data into the data processing unit; reading the process program from the process program storage unit and loading the process program into the data processing unit; executing in the data processing unit the loaded process program on the divided and loaded image data;

returning image data processed in the data processing unit to the image data storage unit; and returning the process program executed in the data processing unit to the process program storage unit. The each step is repeated for each divided image data.

In another aspect of the present invention, an image processing control method in an image processing device, which has a programmable data processing unit, an image data storing unit, and a storage unit of plural process programs, comprises the steps of: carrying out a first step comprising dividing image data from the image data storage unit and loading the image data into the data processing unit; loading to the data processing unit a first process program from the process program storage unit; executing in the data processing unit the loaded first process program on the divided and read image data; returning the image data after processing to the image data storage unit; and returning the executed first process program to the process program storage unit; and carrying out a second step of sequentially repeating for each process program existing in the process program storage unit a step comprising loading to the data processing unit the image data after processing from the image data storage unit; reading a next process program from the process program storage unit; executing in the data processing unit the loaded process program on the read image data; returning the image data after processing to the image data storage unit; and returning the executed process program to the process program storage unit. The first step and the second step are repeated for each divided image data.

BRIEF DESCRIPTION OF THE DRAWINGS

The above and other objects, features and advantages of the present invention will become apparent from the following detailed description taken with the accompanying drawings in which:

FIG. 5 is a diagram illustrating a system configuration example of an image processing device according to an embodiment of the present invention;

FIG. 6 is a diagram explaining a multi-round process concept in a data processing unit in the embodiment;

DESCRIPTION OF THE PREFERRED EMBODIMENT(S)

The problems of the prior art are illustrated below in order to explain the present invention.

Figure 1:
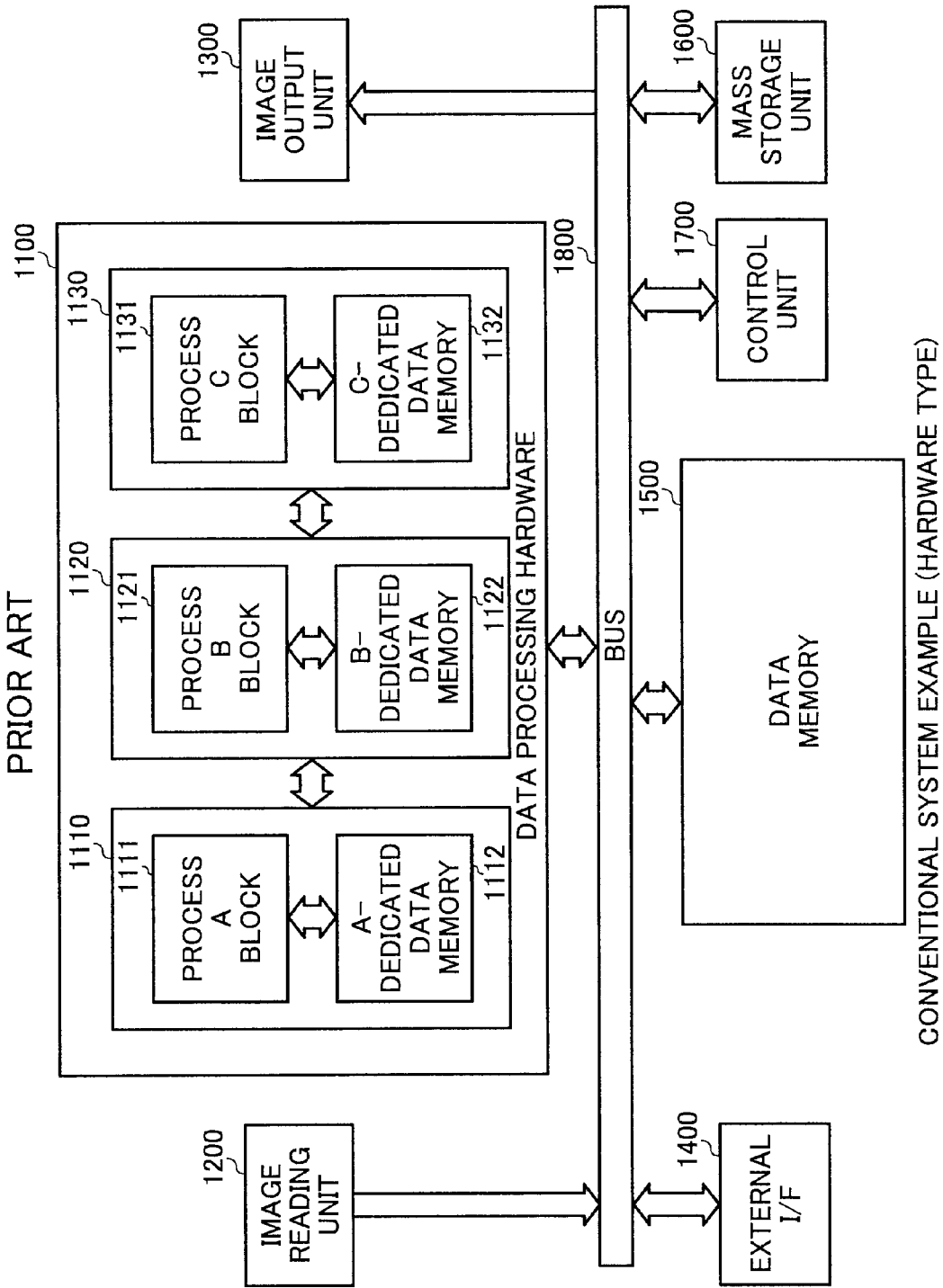
FIG. 1 is a diagram illustrating the system configuration of a conventional image processing device using an ASIC.

FIG. 1 illustrates a system configuration example of a conventional image processing device that uses data processing hardware having plural dedicated processing units. For simplification, in FIG. 1, a data processing hardware (ASIC) 1100 is illustrated herein as comprising three independent dedicated hardware processing units 1110, 1120 and 1130, although normally such data processing hardware comprises more processing units. Herein, the processing unit 1110 comprises a process block (process A block) 1111 for executing an image process A, and a data memory (A-dedicated data memory) 1112 dedicated to the process block. Similarly, the processing unit 1120 comprises a process B block 1121 and a B-dedicated data memory 1122, and the processing unit 1130 comprises a process C block 1131 and a C-dedicated data memory 1132. The processing units 1110, 1120 and 1130 are connected by an internal bus.

In the image processing device of FIG. 1, a system bus 1800 connects, among others, the data processing hardware (ASIC) 1100 having the dedicated hardware processing units 1110, 1120 and 1130, an image reading unit 1200 for reading documents or the like by means, of a scanner or the like, a data output unit 1300 such as a printer or the like for outputting image data to a medium such as paper or the like, an external interface (external I/F) 1400 for exchanging image data with external media (CD, DVD, SD card or the like) and/or external devices (a personal computer or the like), a data memory 1500 being the operating memory of the data processing hardware (ASIC) 1100, a mass storage unit 1600 such as a hard disk or the like for storing image data for, for instance, backup and/or reuse, and a control unit 1700 for controlling the operation of the device as a whole. The data memory 1500 can be used not only as the operating memory of the data processing hardware (ASIC) 1100, but also as the operating memory of the image reading unit 1200, the data output unit 1300, the external interface (external I/F) 1400, the mass storage unit 1600, and the control unit 1700.

Figure 2:
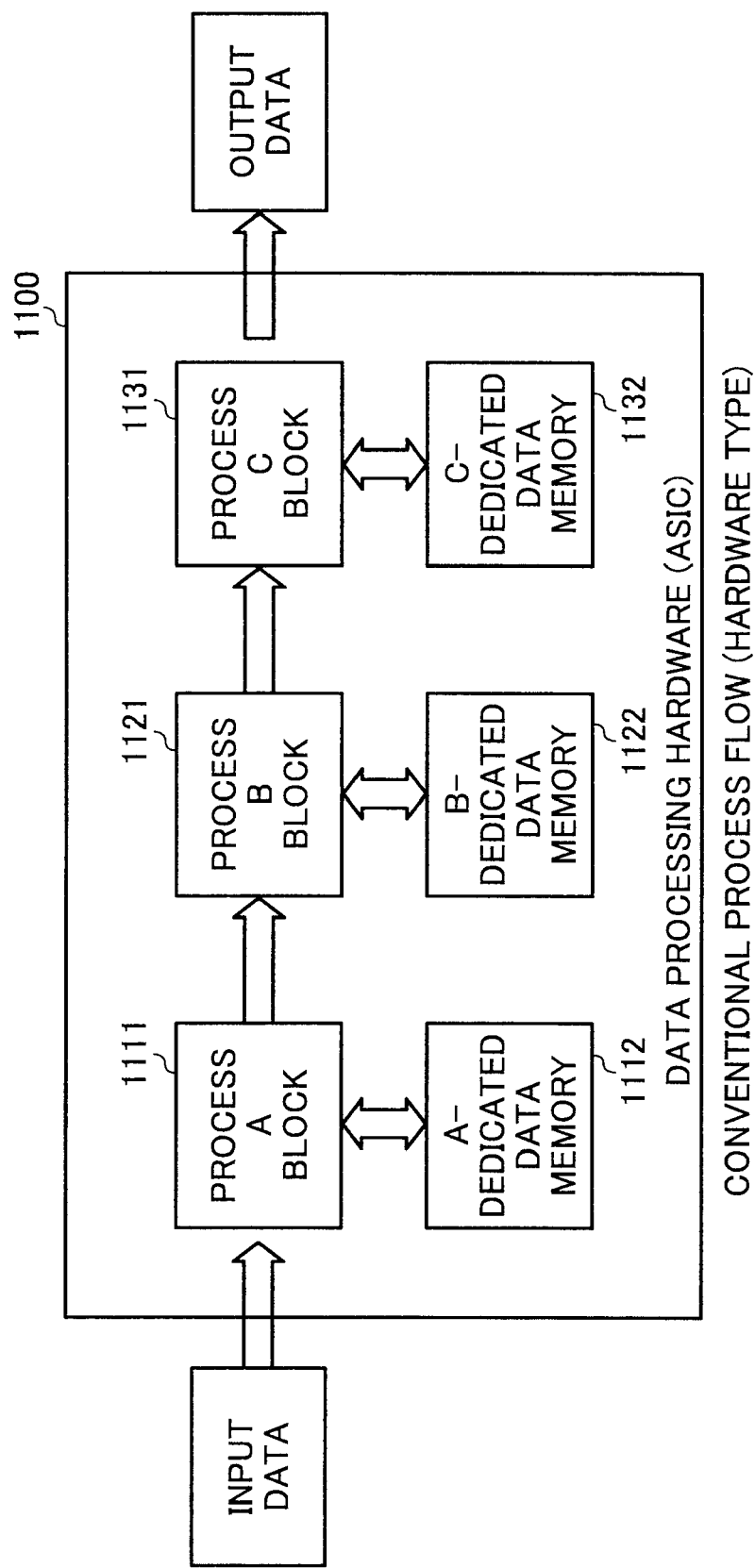
FIG. 2 is a diagram illustrating a process flow in the ASIC.

FIG. 2 is diagram illustrating an example of a process flow in which image data inputted through the reading unit 1200 or the like are sequentially subjected to three image processes, process A→process B→process C, in the data processing hardware (ASIC) 1100 and are then outputted to the data output unit 1300 or the like. Firstly, the hardware logic process A block 1111 executes the process A on the input image data, using the A-dedicated data memory 1112, and transfers to the process B block 1121 image data resulting from the process. The process B block 1121 executes the process B on the image data transferred by the process A block 1111, using the B-dedicated data memory 1122, and transfers to the process C block 1131 image data resulting from the process. The process C block 1131 executes the process C on the image data transferred by the process B block 1121, using the C-dedicated data memory 1132, and outputs the result. Herein, for instance, the control unit 1700 decides which process block is operated.

In an image processing device such as the one illustrated in FIG. 1, using a data processing hardware (ASIC) having plural dedicated processing units is advantageous, as described above, in terms of the afforded superior speed characteristics, but, on the other hand, is problematic because of lack in flexibility as regards functional modifications and/or additions, on account of the hardware logic. Programmable devices such as DSPs (digital signal processors) are often used as a solution to this problem.

Figure 3:
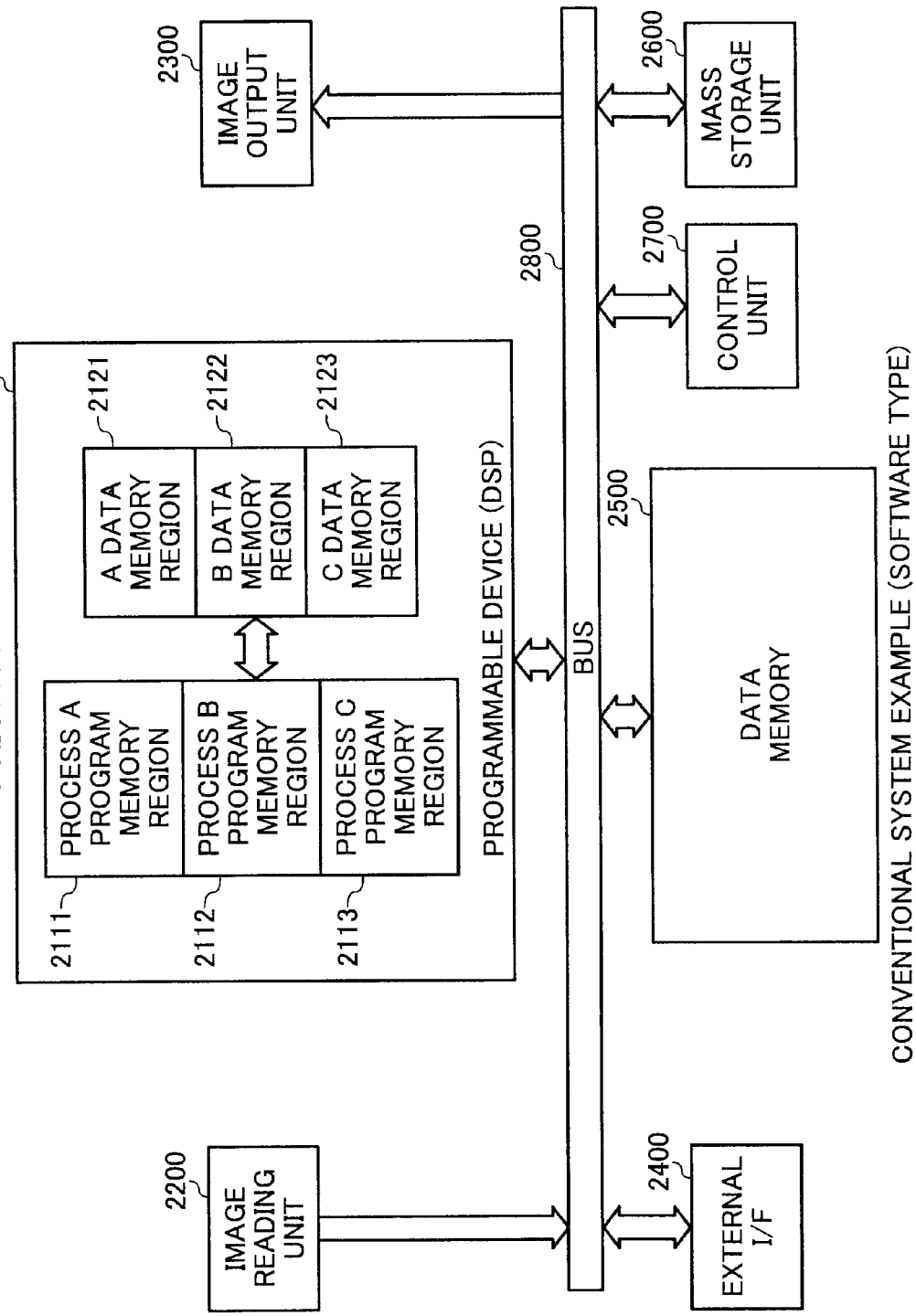
FIG. 3 is a diagram illustrating the system configuration of a conventional image processing device using a DSP.

FIG. 3 is a system configuration example of a conventional image processing device using a programmable device (DSP) for implementing plural image process functions. The system configuration of the image processing device of FIG. 3 is basically identical to that of FIG. 1, except that herein the ASIC data processing hardware is replaced by a DSP programmable device 2100. In the programmable device 2100 plural programs (herein, a process A program, a process B program and a process C program), corresponding to plural process functions, are loaded beforehand into respective program memory regions 2111, 2112 and 2113. Data memory regions are secured beforehand for the respective process programs. Herein, these memory regions are an A data memory region 2121, a B data memory region 2122 and a C data memory region 2123.

Figure 4:
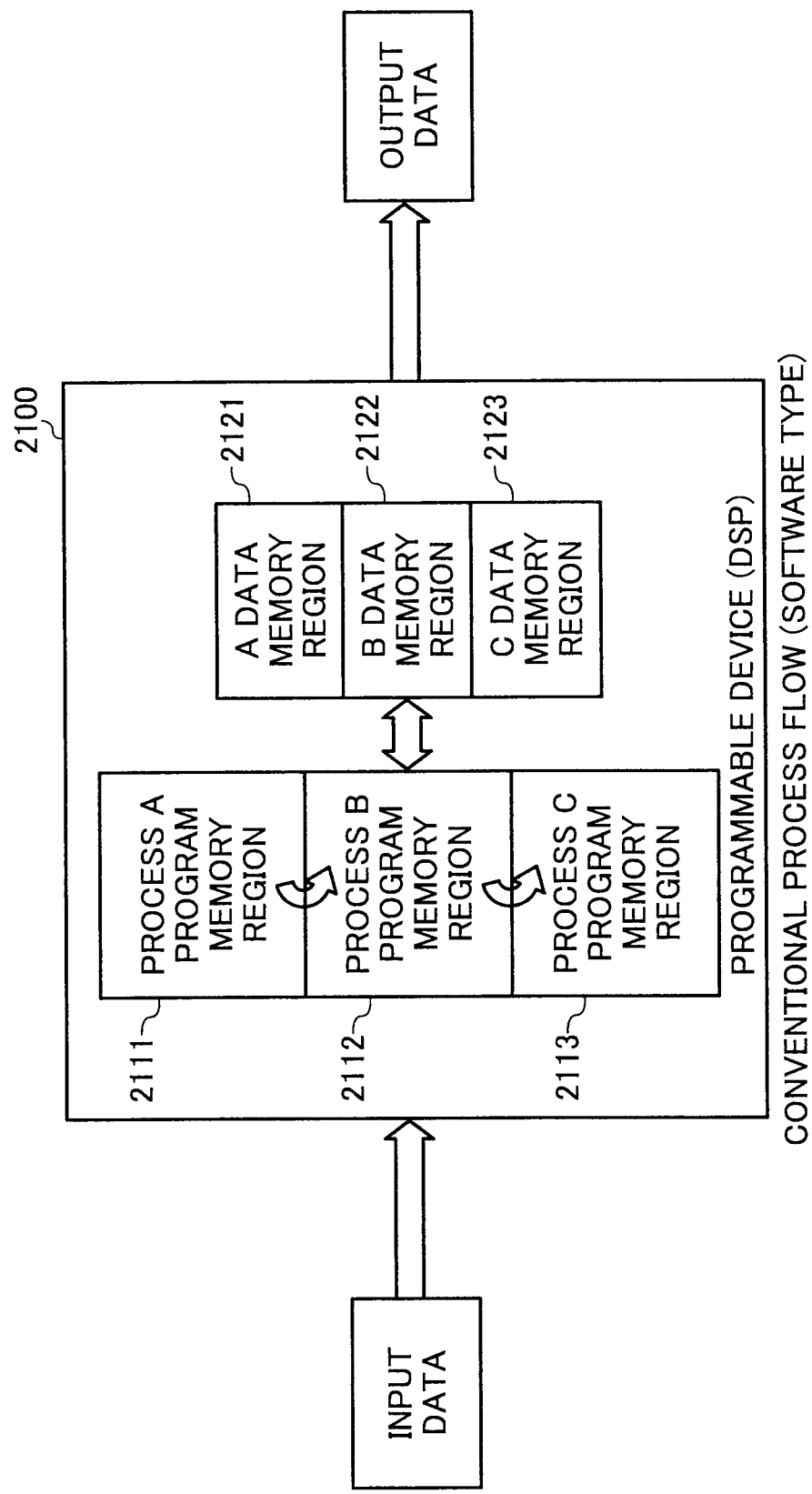
FIG. 4 is a diagram illustrating a process flow in the DSP.

FIG. 4 is diagram illustrating an example of a process flow in which image data inputted through an image reading unit 2200 or the like are sequentially subjected to three image processes, process A→process B→process C, in the programmable device (DSP) 2100 and are then outputted to the image output unit 2300 or the like. Firstly, the process A program of the program memory region 2111 executes the process A on the input image data, using the A data memory region 2121. Next, the process B program of the program memory region 2112 executes the process B on the image data processed by the process A program, using the B data memory region 2122. Lastly, the process C program of the program memory region 2113 executes the process C on the image data processed by the process B program, using the C data memory region 2123, and outputs the result. Herein, for instance, a control unit 2700 decides which process program is operated.

The advantage of using a programmable device such as a DSP lies in that, as described above, process functions can be modified/supplemented flexibly by re-downloading process programs to the DSP; on account of software processing, however, programmable devices are by contrast inferior to dedicated hardware logics as regards speed characteristics. Conventional programmable devices are also costly since each process requires a process program memory and data memory.

An embodiment of the present invention that solves the above-described conventional problems is explained next with reference to accompanying drawings. In the embodiment below will be explained in detail plural (three) processes being repeatedly and sequentially executed for each divided image data, as well as a case in which boundary data of a previous divided image data must be passed on to the following process of the divided image data. Those cases in which a single process is repeatedly executed for each divided data, and/or those cases that do not require passing on of boundary data between divided image data can be easily derived by analogy.

FIG. 5 illustrates a system configuration example of an image processing device according to the present embodiment. This image processing device comprises a programmable data processing unit 110 such as a DSP or the like; a data input unit 120 such as a scanner or the like, for inputting a document and/or other image data; a data output unit 130 such as a printer or the like for outputting image data to a medium such as paper or the like, an external interface (external I/F) 140 for exchanging image data with external media (CD, DVD, SD card or the like) and/or external devices (a personal computer or the like); a data memory 150 such as a DDR or the like for temporarily accumulating, for instance, image data inputted through the data input unit 120 and/or the external I/F 140, for storing image data resulting from processing, and storing program code (hereinafter, programs); a mass storage unit 160 such as a hard disk or the like, for storing image data for, for instance, backup and/or reuse; a controller 170 such as a DMA controller or the like for controlling the transfer of programs and image data in the data memory 150 to the data processing unit 110; a nonvolatile storage medium 180 in which the plural programs to be processed are stored beforehand; a control CPU 190 for controlling the operation of the device as a whole and for controlling the loading of the programs in the storage medium 180 to the data memory 150; and a system bus 200 for connecting the foregoing units.

In the data memory 150 are provided, as memory regions relating to the present embodiment, an input data storage region 151 in which are stored image data inputted by the data input unit 120, an after-process data storage region 152 in which are stored image data processed by the data processing unit 110, and process program storage regions in which are stored process programs of the data processing unit 110, as well as processing parameters thereof, loaded beforehand from the storage medium 180. In the present embodiment, there are three process programs in the data processing unit 110: a process A program, a process B program and a process C program, for which a process A program storage region 153, a process B program storage region 154, and a process C program storage region 155 are respectively assigned in the data memory 150. The process programs stored in the data memory 150 may be normally one ore more, in accordance with the type of processing performed on the target image data. Depending on the program, process parameters may be unnecessary. In the input data storage region 151 and in the after-process data storage region 152, the image data to be processed are divided into plural small process units; herein, although sufficient storage capacity can be afforded by just sequentially overwriting the image data of the divided process units (input divided image data or divided image data after processing), the storage regions are provided in practice with some slack capacity. The input data storage region 151 may be provided with just enough storage capacity such that all the input image data to be processed can be accumulated therein. This allows restarting a process from the beginning, using input image data stored in the input data storage region 151, when, for instance, an error or the like occurs during processing. The data memory 150 has a reading/writing pointer for the input data storage region 151 and/or for the after-process data storage region 152.

The data processing unit 110 has a process program memory region (program memory) 111 in which are stored programs to be processed and process parameters thereof loaded from the data memory 150, a data memory region 112 in which are stored process unit image data (divided image data) transferred from the data memory 150, and a CPU 113 for executing processing of the image data of the data memory region 112 on the basis of programs and parameters thereof of the process program memory 111.

In the present embodiment, the process programs to be executed and the process parameters thereof are loaded sequentially and repeatedly from the data memory 150 to the process program memory region 111 of the data processing unit 110, the plural processes are executed sequentially and repeatedly on the divided image data, and then the processed programs and parameters are written back, upon each process, to the data memory 150. Upon writeback, if necessary, boundary data, included as part of the parameters, are passed on to the process of the next divided image data. Upon each loading of the process programs and the process parameters, the image data to be processed (divided image data) are transferred from the data memory 150 to the data memory region 112 of the data processing unit 110, then the processed image data (divided image data after processing) are likewise written back to the data memory 150. With a small-scale process program memory region 111 for at most one process program and process parameters, and a small-scale data memory region 112 for the process unit divided image data (specifically, divided image data+boundary data), thus, the data processing unit 110 can handle plural process functions while affording a considerable cost reduction vis-à-vis conventional DSPs. The data processing unit 110 is a programmable device, in which loaded programs can be arbitrarily modified and/or supplemented, so as to allow freely modifying and/or supplementing process functions.

FIG. 6 is diagram illustrating an example of a process concept in which image data inputted through the data input unit 120 or the like are divided into plural small process units, the inputted image data being then sequentially subjected, in divided process units, to three image processes, process A→process B→process C, in the data processing unit 110, and are then sequentially outputted to the data output unit 130 or the like. That is, the image data to be processed are plurally divided, the divided image data being treated as process units, then the process A, process B and process C are processed sequentially, in a multi round fashion, and the resulting data are outputted. Upon processing of each of the process A, process B and process C, the process A program, the process B program and the process C program, together with the process parameters thereof are loaded from the data memory 150 to the process program memory region 111 of the data processing unit 110, with overwriting. When the processes are over, the process programs and the parameters thereof are written back again to the data memory 150. Similarly, the divided image data to be processed are transferred from the data memory 150, upon each processing, to the data memory region 112 of the data processing unit 110, while the divided image data after processing are written back again to the data memory 150.

In case of only one program for processing, the relevant process program is loaded from the data memory 150 to the data processing unit 110, and the image data from the data memory 150 are divided and are transferred to the data processing unit 110, so that the data processing unit 110 executes on the divided image data a desired process, on the basis of the process program. Once the process is over, the program is written back to the data memory 150, and similarly, the divided image data after processing are written back to the data memory 150. This is repeated for each divided image data, in sequence, and the divided image data after processing are outputted to the data output unit 130 or the like.

Figure 7A:
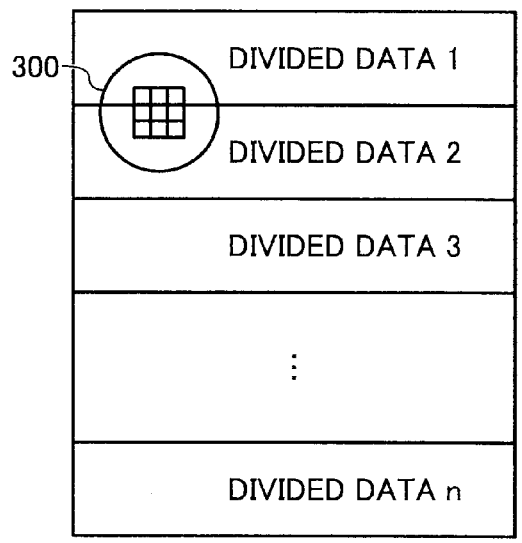
FIGS. 7A through 7D are diagrams explaining one example of processing across the boundary of divided data.
Figure 7B:
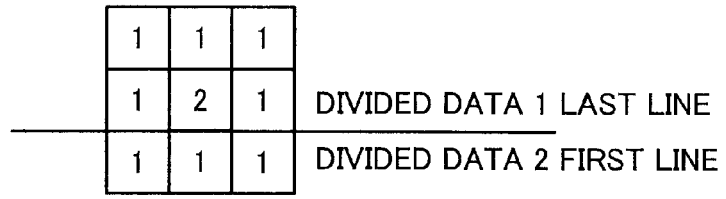
Figure 7C:
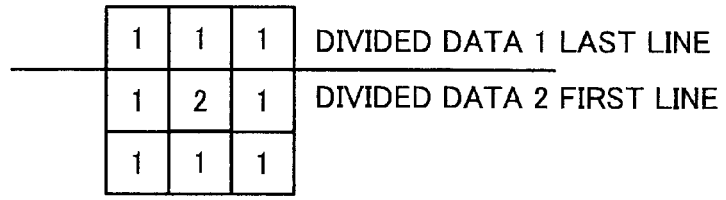
Figure 7D:
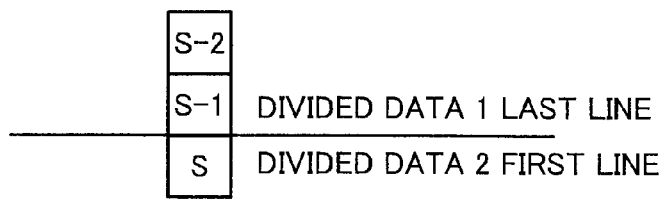

In case of plural division of the image data to be processed, such that the respective divided image data are processed as process units, it may be necessary, depending on the process type, to pass on, to a next divided image data process, data or other information of the last line, and/or of several lines before the last line, of a previous divided image data. Processing of the last line or the like of a current divided image data, also, requires data of a head line or the like of the next divided image data. A boundary region 300 between divided data 1 and next thereto divided data 2, such as the one illustrated in FIG. 7A, is discussed next. In this case, when for instance a 3×3 filter is used in a spatial filter process, it is necessary, as illustrated in FIG. 7B, to carry out calculations using data (pixel value) of the head line of the next divided data 2 in the processing of the last line of the divided data 1, while for the processing of the first line of the next divided data 2 it is necessary to carry out calculations using data (pixel value) of the last line of the previous divided data 1, as illustrated in FIG. 7C. In state machine processing, as illustrated in FIG. 7D, it is necessary to refer to and to decide the state (status) up to the last line of the previous divided data 1 in order to decide the state of the first line of the divided data 2.

During writeback to the data memory 150 of programs and parameters processed by the data processing unit 110 in the present embodiment, desired boundary data (number of processed lines, image data of a predetermined number of lines, state data and the like) are set in relevant program and parameter regions and are written back to the data memory 150, to pass on thereby boundary data of a previous divided image data to the process of a next divided image data. If necessary, a data header is appended to the processed divided image data and is written back to the data memory 150.

Figure 8A:
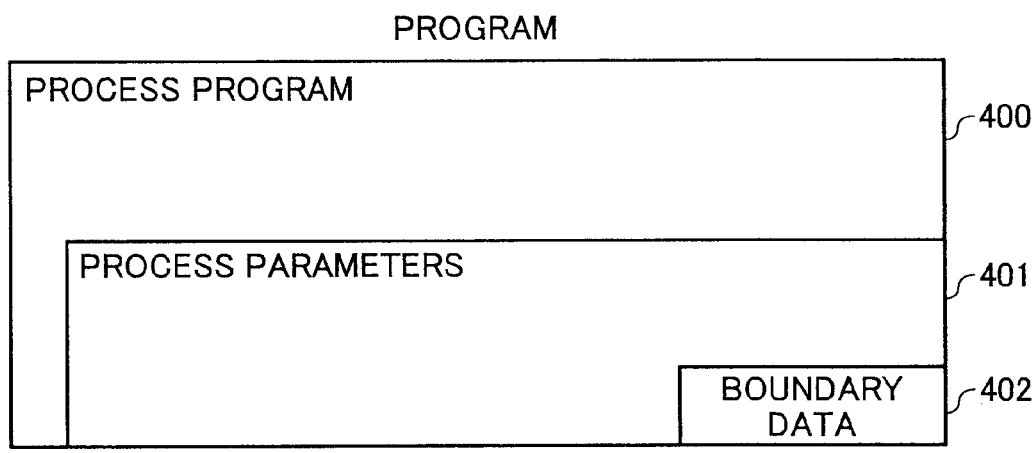
FIGS. 8A and 8B are diagrams illustrating an example of program and data configuration in the embodiment.

As illustrated in FIG. 8A, a process program 400 includes process parameters 401 thereof, a part of the process parameters 401 being supplemented with boundary data 402. In the case of, for instance, the spatial filter processing with a 3×3 filter illustrated in FIGS. 7A and 7C, when the initial divided image data 1 is transferred from the data memory 150, the CPU 113 of the data processing unit 110 carries out processing up to the line prior to the last line of the divided image data 1, and writes the process result, as the divided image data 1 after processing, back to the data memory 150. The CPU 113 sets then in the process parameters 401, as the boundary data 402, the number of processed lines of the divided image data 1, (number of lines up to the line before the last line), and two lines of pre-process data, i.e. the last line remaining in the data memory region 112 and the line previous thereto, and writes those data back to the data memory 150 together with the process program 400. Thereafter, upon transfer from the data memory 150 of the process program 400, the process parameters 401 and the next divided data 2, the CPU 113 extracts from the boundary data 402 of the process parameters 401 the data of the last two lines of the divided data 1, joins those data with the head of the divided data 2, and, on the basis of the number of processed lines of the boundary data 402, initiates processing of those data, as the divided data 2, from the last line of the divided data 1. An identical process is repeated for each divided data. Fault-free processing is thus carried out also across boundaries, as illustrated in FIGS. 7B and 7C. In the case of the state machine process illustrated in FIG. 7D, state data S-1, S-2 and the like of the processed divided data 1 are set as the boundary data 402 in the process parameters 401 of the process program 400, as a result of which the state S of the first line of the next divided data 2 can be decided by referring to the boundary data 402.

The above processes can be implemented easily in the CPU 113 of the data processing unit 110 by, for instance, including in the process program 400 itself the required procedures. Alternatively, the CPU 113 itself can also use own hardware logic means to carry out the processes, by discriminating for instance the type of process program 400.

Figure 8B:
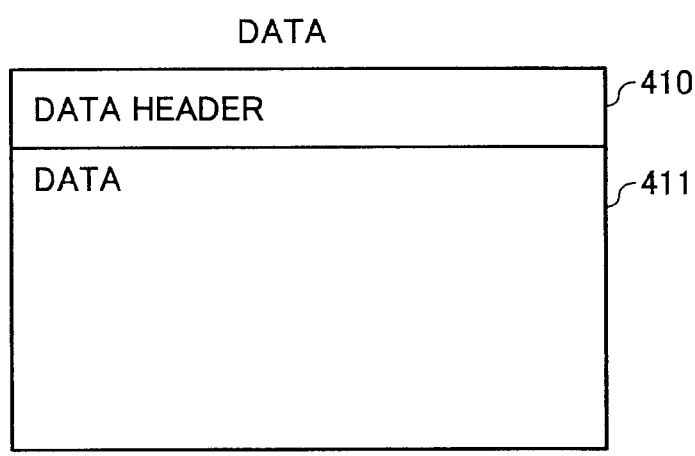

FIG. 8B is an example of the configuration of image data (divided image data) exchanged between the data processing unit 110 and the data memory 150. Herein, the reference numeral 410 denotes a data header, and the reference numeral 411 denotes data after processing (divided image data), in the data header 410 being written necessary information to be passed on to the next process, such as number of processed lines. By referring to the data header 411, the CPU 113 of the data processing unit 110 can faultlessly carry out the necessary processes in sequence, with the divided image data as process units.

Figure 9:
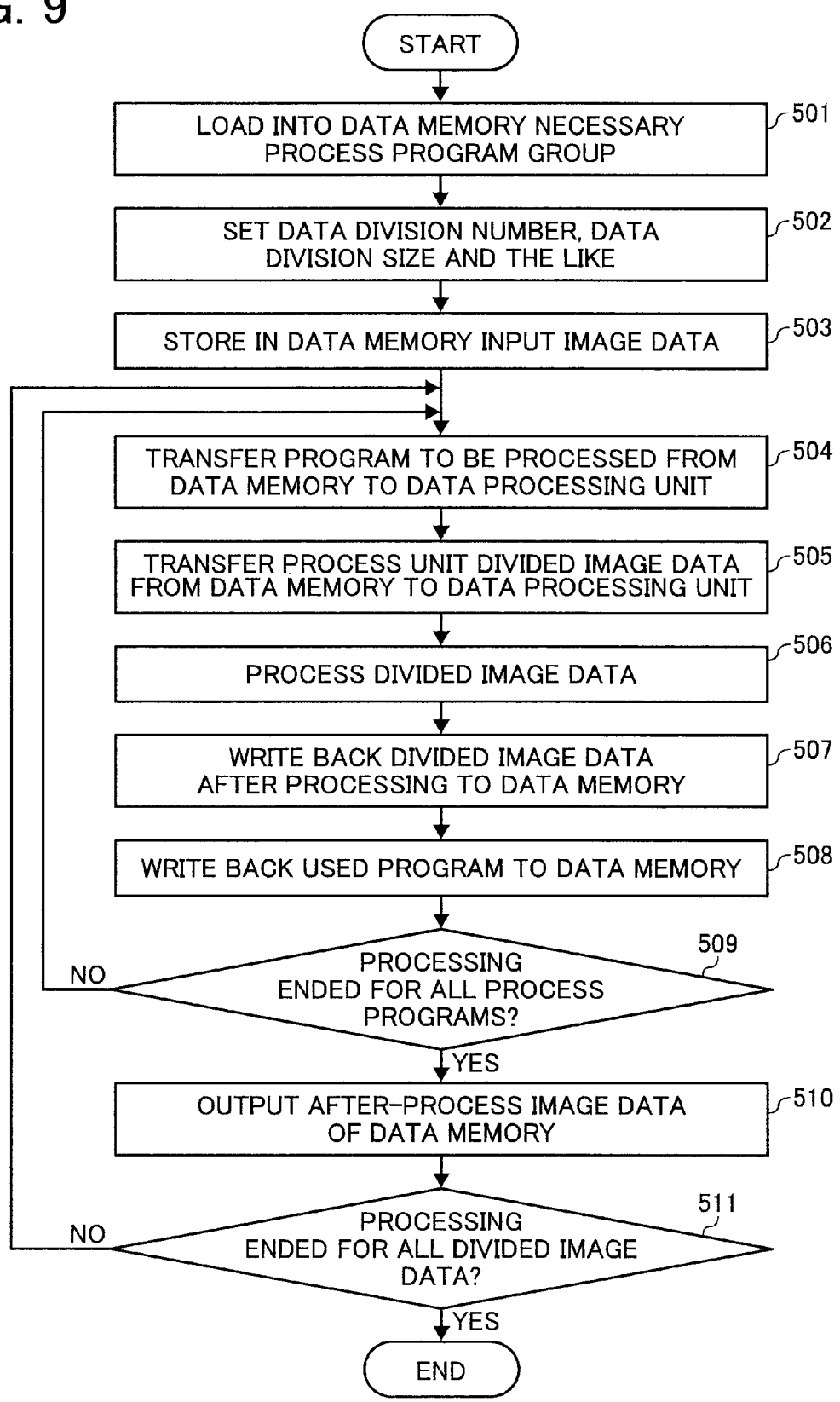
FIG. 9 is a diagram illustrating a global process flowchart of the embodiment.

FIG. 9 illustrates a global process flowchart of the present embodiment. The operation of the main elements of FIG. 5 will be explained in detail based on FIG. 9. Herein, as in FIG. 6, image data inputted through the data input unit 120 are plurally divided, then, in parallel with the input operation of the data input unit 120, the respective divided image data are sequentially subjected to, as process units, to three image processes in the data processing unit 110, process A→process B→process C, then the divided image data after processing are outputted in sequence to the data output unit 130.

Figure 10:
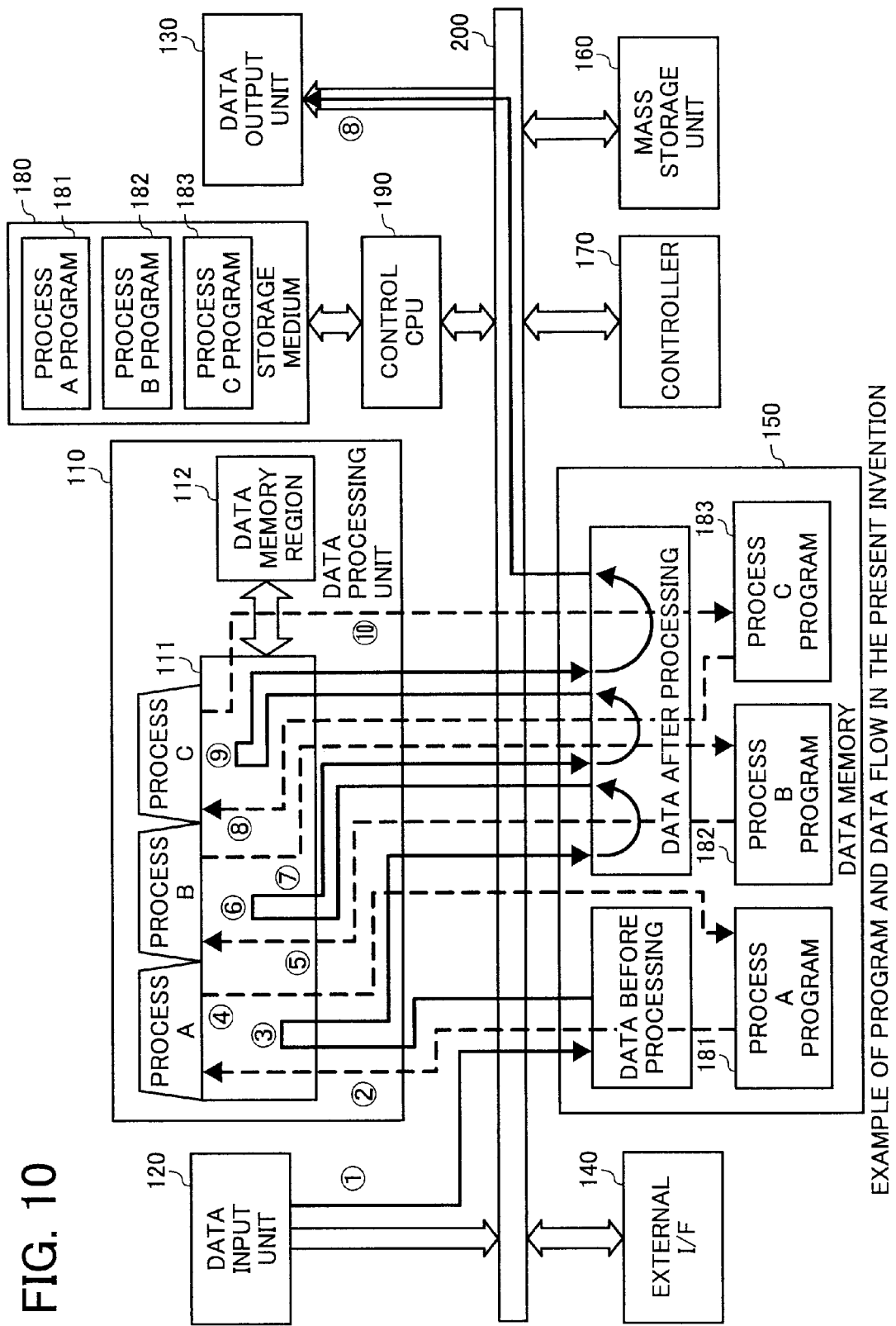
FIG. 10 is a diagram illustrating program and data flow in the embodiment.

FIG. 10 is a diagram illustrating the specific program and data flow in such a case, and FIG. 11 is a diagram illustrating program and data transition in the data memory 150. In the input data storage region 151 of the data memory 150 in FIG. 11, with storage capacity for enabling storage of one divided image data, the inputted image data are cyclically stored in sequence with overwriting; if the storage capacity allows storing all the input image data to be processed, the inputted image data may be stored sequentially, and, in parallel therewith or after storage of all the image data to be processed, the divided image data may be sequentially read out.

Prior to the beginning of processing, such as at system startup, the control CPU 190 reads a process A program 181, a process B program 182 and a process C program 183 in the storage medium 180 and, via the system bus 200, loads these process programs 181, 182 and 183 to the process A program storage region 153, the process B program storage region 154, and the process C program storage region 155 in the data memory 150 (step 501). The process programs 181, 182 and 183 include respective process parameters thereof. The control CPU 190 sets, and notifies to the controller 170, for instance the number of data divisions, the size of the data divisions, the selection order of the respective process programs 181, 182 and 183 loaded to the data memory 150, and the addresses thereof in the data memory 150 (step 502). The number of the data divisions and/or the size of the data divisions are determined, for instance, on the basis of the data amount obtained by pre-reading the image data to be processed and on the basis of the size of the data memory region 112 of the data processing unit 110. The number of the data divisions and/or the size of the data divisions may also be designated by the user, or may be values fixed beforehand.

FIG. 11A illustrates the state of the data memory 150 at this time. The input data storage region 151 and the after-process data storage region 152 are empty, while in the process program storage regions 153, 154 and 155 are stored the relevant process programs and process parameters thereof.

Control passes then to the controller 170. Under the control of the controller 170, as illustrated in FIG. 10, programs and data are repeatedly transferred and written back between the data processing unit 110 and the data memory 150, with the respective divided image data as process units, and the three processes process A→process B→process C are carried out sequentially in the data processing unit 110, the divided image data after processing being outputted in sequence to the data output unit 130.

Figure 11B:
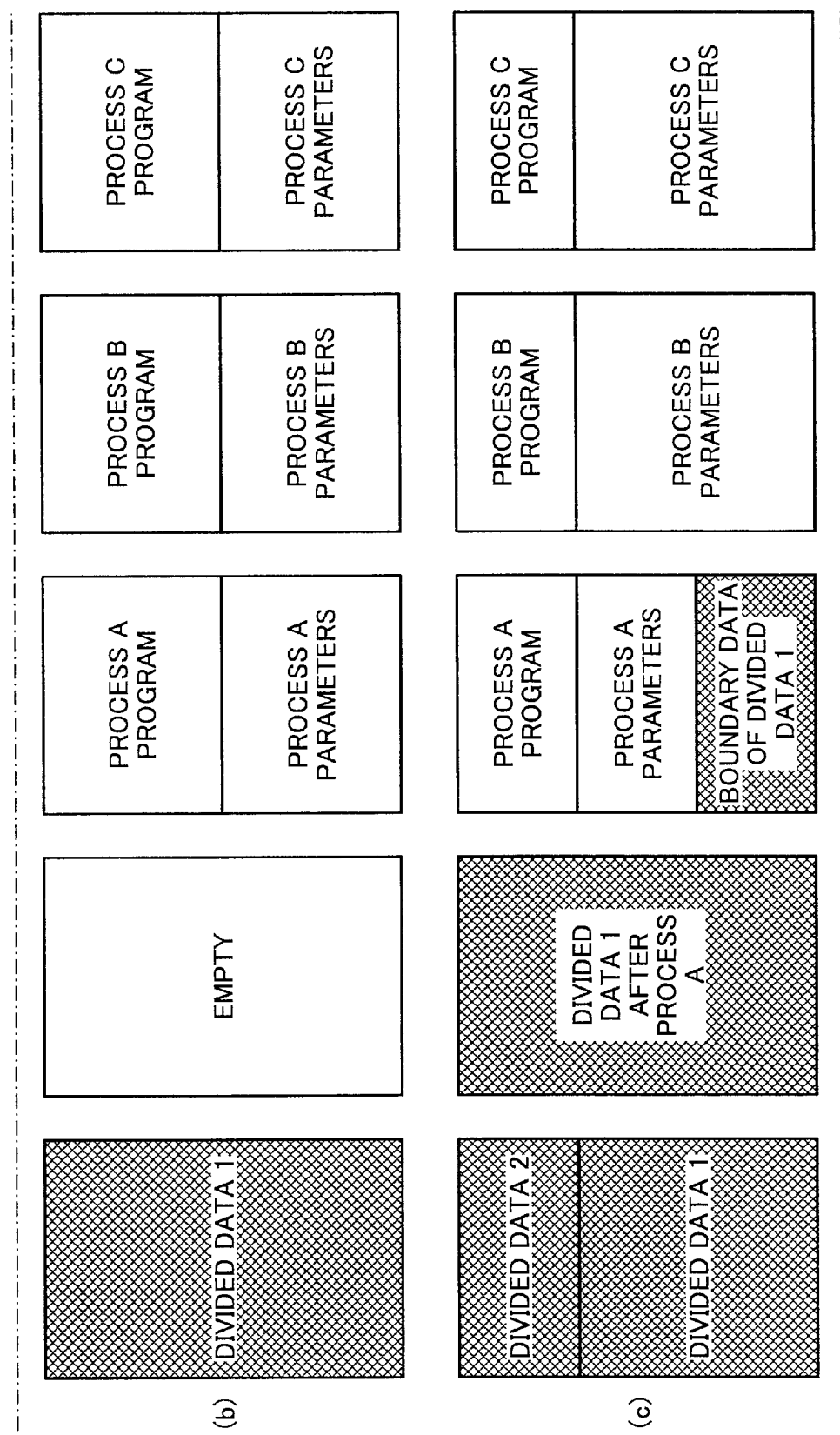
FIG. 11 is a diagram illustrating program and data transition in a data memory of the embodiment.

Upon pressing of a start button, for instance, the data input unit 120 starts reading image data. The image data to be processed, read by the data input unit 120, are stored sequentially, via the system bus 200, in the input data storage region 151 of the data memory 150 (step 503). FIG. 11B illustrates a state in which the input data storage region 151 is full with an initial process unit of image data.

When image data of a data division size (process unit) are stored in the input data storage region 151 of the data memory 150 (the situation in FIG. 11B), the controller 170 reads first the process A program and the process A parameters from the process A program storage region 153 of the data memory 150, and transfers them to the data processing unit 110 via the system bus 200 using a DMA scheme (step 504). Next, the controller 170 reads image data of a data division size (divided image data 1) from the head of the input data storage region 151 of the data memory 150, and, similarly, transfers the data to the data processing unit 110 via the system bus 200 using a DMA scheme (step 505). The value of the writing pointer corresponding to the input data storage region 151 allows knowing the amount of input image data stored in the input data storage region 151 of the data memory 150. The controller 170 can monitor and assess directly the input image data on the system bus 200.

In the data processing unit 110, the process A program 181 and the process A parameters are stored in the process program memory region 111, and the divided image data 1 are stored in the data memory region 112. The CPU 113 of the data processing unit 110 executes on the divided image data 1 of the data memory region 112 a desired process A (for instance, shading correction or the like), on the basis of the process A program 181 and the process parameters thereof of the process program memory region 111 (step 506), then the divided image data 1 after the process A are written back to the after-process data storage region 152 of the data memory 150 via the system bus 200 (step 507). If necessary, a data header is generated and is written back together with the divided image data after process A. In the data header is inserted information to be passed on to the next process (herein, process B). The writeback of divided image data after being processed may be, for instance, a writeback to line units or a block writeback. Once the writeback of the divided image data 1 after the process A is completed, the CPU 113 writes back the process A program 181 and the process A parameters of the process program memory region 111 to the process A program storage region 153 of the data memory 150, via the system bus 200 (step 508). If necessary, the CPU 113 creates then, on the basis for instance of the data held in the data memory region 112, boundary data (for instance, number of processed lines, image data of predetermined lines, state data and the like) of the divided image data 1, sets these boundary data as part of the process A parameters, and writes the data back to the process A program storage region 153 of the data memory 150.

Figure 11C:
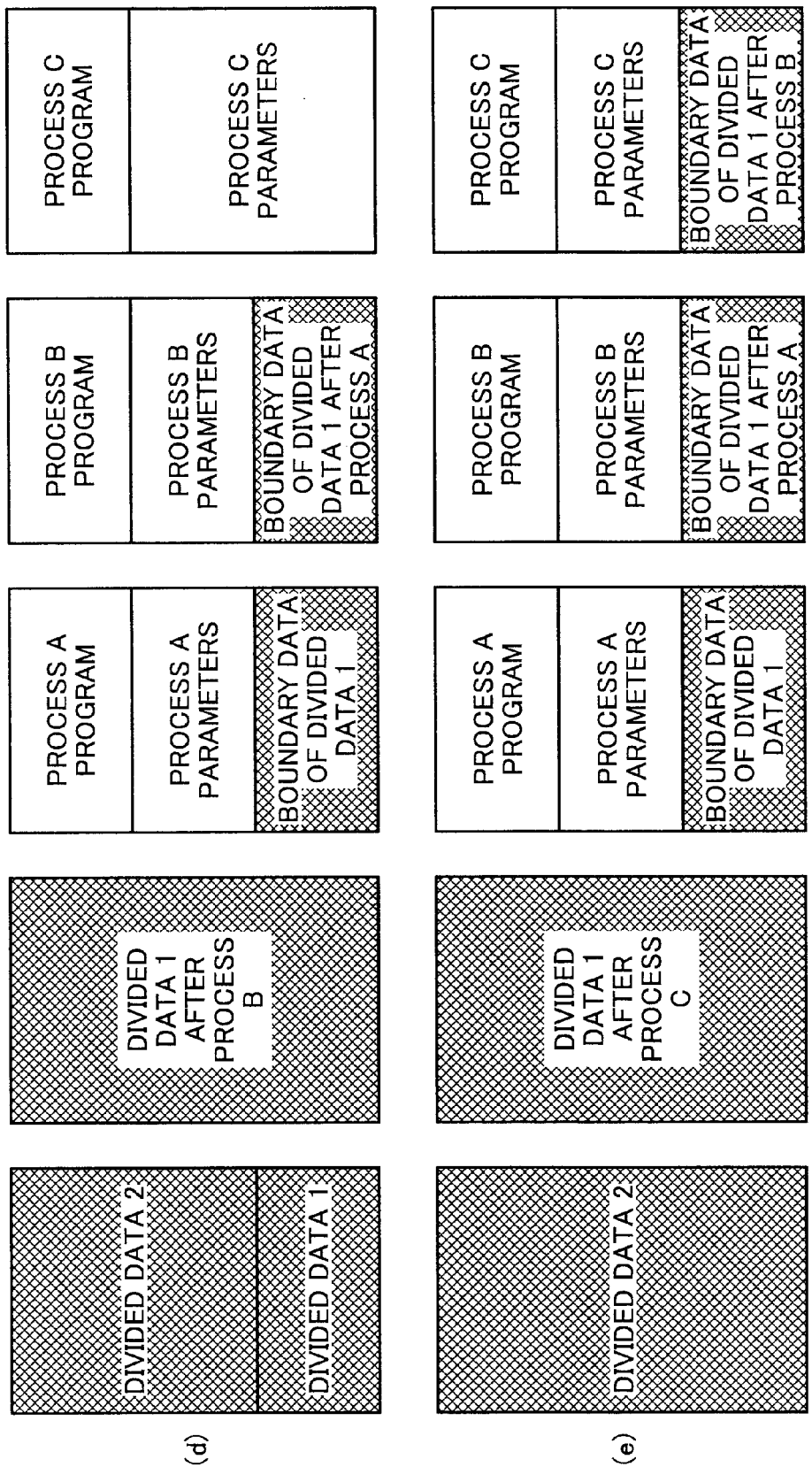

FIG. 11C illustrates the state of the data memory 150 at this time. The next image data begin to accumulate in the input data storage region 151 The divided image data 1 after the process A are stored in the after-process data storage region 152. The process A program 181 and the process A parameters are written back to the process A program storage region 153, and the boundary data of the divided data 1 are set in the process A parameters. The process B program storage region 154 and the process C program storage region 155 remain as in FIG. 11B.

Next, the controller 170 reads the process B program 182 and the process B parameters from the process B program storage region 154 of the data memory 150, and transfers them to the data processing unit 110 via the system bus 200 using a DMA scheme (step 504). The controller 170 reads then from the after-process data storage region 152 of the data memory 150 the divided image data 1 after the process A, and, likewise, transfers the data to the data processing unit 110 via the system bus 200 using a DMA scheme (step 505).

Specifically, the controller 170 assesses the process status of the data processing unit 110 by, for instance, monitoring the data transfer status on the system bus 200, such that when the processing of the current process program is ended and the program, image data after processing (divided image data after processing) and the like are written back to the data memory 150, the controller 170 transfers to the data processing unit 110 the next process program and the like. The controller 170 may also transfer to the data processing unit 110 the next process program and the like upon receipt from the data processing unit 110 of a notification to the effect that processing of the current process program is over.

In the data processing unit 110, the process B program 182 and the process B parameters are stored in the process program memory region 111, and the divided image data 1 after the process A are stored in the data memory region 112. The CPU 113 of the data processing unit 110 executes on the divided image data 1 after the process A of the data memory region 112 a desired process B (for instance, MTF filtering, gamma conversion or the like), on the basis of the process B program 182 and the parameters thereof of the process program memory region 111 (step 506), then the divided image data 1 after the process B are written back to the after-process data storage region 152 of the data memory 150 via the system bus 200 (step 507). If necessary, a data header is generated and is written back together with the divided image data 1 after the process B. In the data header is inserted information to be passed on to the next process (herein, process C). Once the writeback of the divided image data 1 after the process B is completed, the CPU 113 writes back the process B program 182 and the process B parameters of the process program memory region 111 to the process B program storage region 154 of the data memory 150, via the system bus 200 (step 508). If necessary, the CPU 113 creates then boundary data of the divided image data 1 after the process A, sets these boundary data as part of the process B parameters, and writes the data back to the process B program storage region 154 of the data memory 150.

Figure 11D:
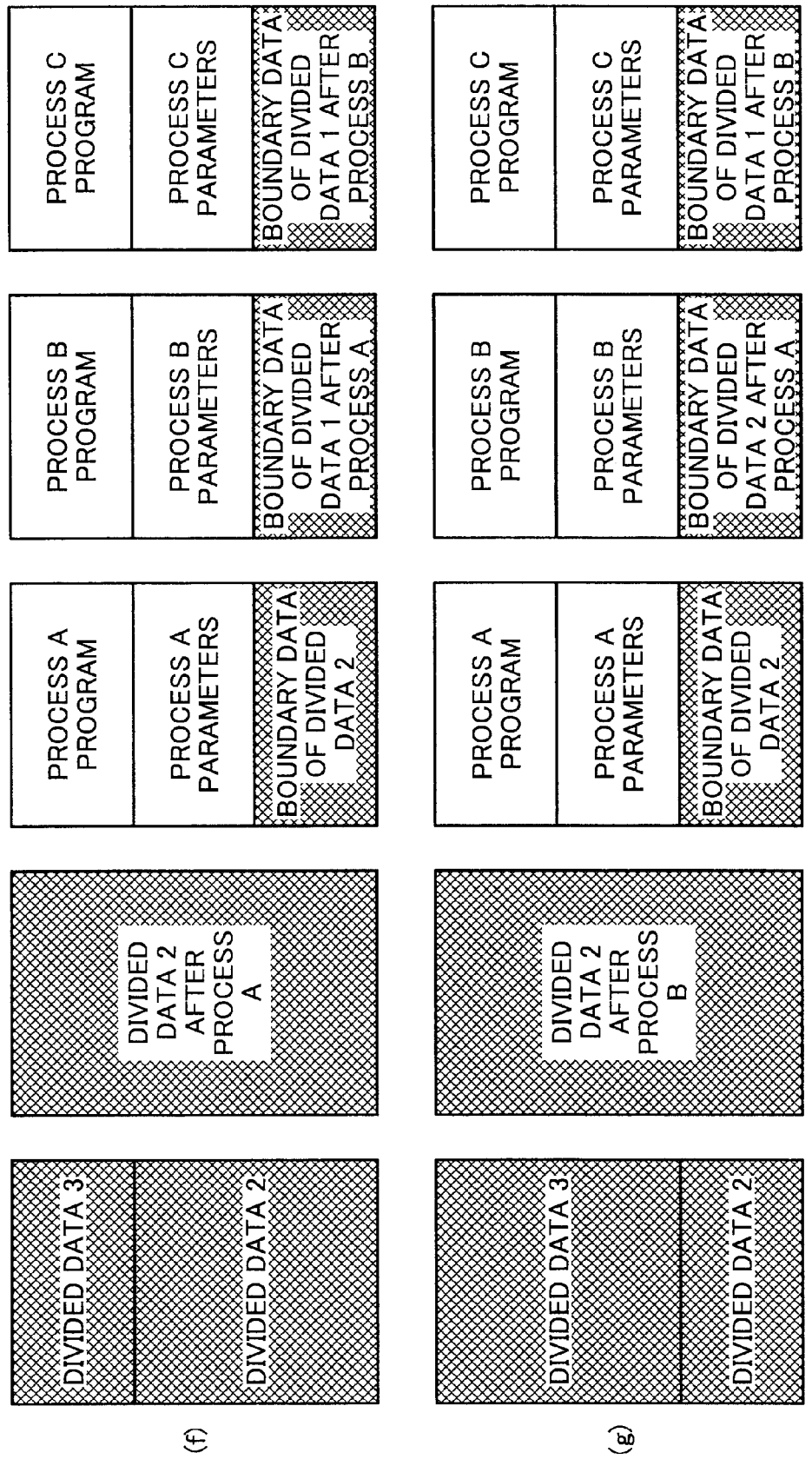

FIG. 11D illustrates the state of the data memory 150 at this time. The image data from the data input unit 120 continue accumulating with overwriting in the input data storage region 151. The image data in the after-process data storage region 152 are rewritten with the divided image data 1 after the process B. The process B program 182 and the process B parameters are written back to the process B program storage region 154, and the boundary data of the divided data 1 after the process A are set in the process B parameters. The process A program storage region 153 remains as in FIG. 11C, while the process C program storage region 15 continues as in FIG. 11B.

Next, the controller 170 reads the process C program 183 and the process C parameters from the process C program storage region 155 of the data memory 150, and transfers them to the data processing unit 110 via the system bus 200 using a DMA scheme (step 504). The controller 170 reads then from the after-process data storage region 152 of the data memory 150 the divided image data 1 after the process B, and, likewise, transfers the data to the data processing unit 110 via the system bus 200 using a DMA scheme (step 505).

In the data processing unit 110, the process C program 183 and the process C parameters are stored in the process program memory region 111, and the divided image data 1 after the process B are stored in the data memory region 112. The CPU 113 of the data processing unit 110 executes on the divided image data 1 after the process B of the data memory region 112 a desired process C (for instance, gradation processing or the like), on the basis of the process C program 183 and the parameters thereof of the process program memory region 111 (step 506), then the divided image data 1 after the process C are written back to the after-process data storage region 152 of the data memory 150 via the system bus 200 (step 507). Once the writeback of the divided image data 1 after the process C is completed, the CPU 113 writes back the process C program 183 and the process C parameters of the process program memory region 111 to the process C program storage region 155 of the data memory 150, via the system bus 200 (step 508). If necessary, the CPU 113 creates then boundary data of the divided image data 1 after the process B, sets these boundary data as part of the process C parameters, and writes the data back to the process C program storage region 155 of the data memory 150.

Figure 11E:
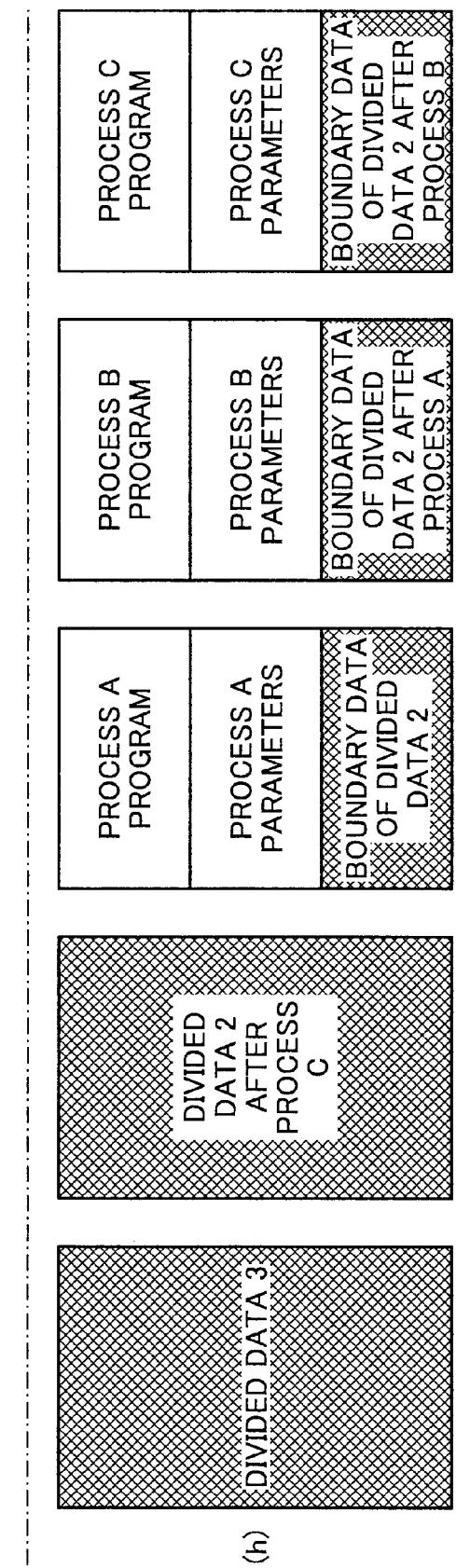

FIG. 11E illustrates the state of the data memory 150 at this time. The next image data to be processed accumulate substantially in the input data storage region 151. The image data in the after-process data storage region 152 are rewritten with the divided image data 1 after the process C. The process C program 183 and the process C parameters are written back to the process C program storage region 155, and the boundary data of the divided data 1 after the process B are set in the process C parameters. The process A program storage region 153 continues as in FIG. 11C, while the process B program storage region 154 remains as in FIG. 11D.

Once the processes A through C are over for the divided image data 1 as the initial process unit (step 509), the controller 170 reads from the after-process data storage region 152 of the data memory 150 the divided image data 1 after the process C, and outputs these data to the data output unit 130 via the system bus 200 (step 510). The control CPU 190 may be responsible for this output process. In this case the controller 170 can initiate the next process in parallel with the output process by the control CPU 190.

When the image data to be processed next accumulate in the input data storage region 151 of the data memory 150 (FIG. 11E), the controller 170 reads again the process A program 181 and the process A parameters from the process A program storage region 153 of the data memory 150, and transfers them to the data processing unit 110 via the system bus 200 using a DMA scheme (step 504). Next, the controller 170 reads image data of the next process unit (divided image data 2) accumulated in the input data storage region 151 of the data memory 150, and, similarly, transfers the data to the data processing unit 110 via the system bus 200 using a DMA scheme (step 505).

In the data processing unit 110, the process A program 181 and the process A parameters are stored in the process program memory region 111, and the divided image data 2 are stored in the data memory region 112. The CPU 113 of the data processing unit 110 executes on the divided image data 2 of the data memory region 112 a desired process A (for instance, similarly, shading correction or the like), on the basis of the process A program 181 and the process parameters thereof of the process program memory region 111 (step 506); then, when the boundary data of the divided image data 1 are set in the process A parameters, the process A is then executed for instance joining the image data of the boundary data to the head of the divided image data 2 of the data memory region 112 (as in FIGS. 7B and 7C), or referring to the boundary data (as in FIG. 7D). The divided image data 2 after the process A are written back, together with the data header, to the after-process data storage region 152 of the data memory 150 via the system bus 200 (step 507). Once the writeback of the divided image data 2 after the process A is completed, the CPU 113 writes back the process A program 181 and the process A parameters of the process program memory region 111 to the process A program storage region 153 of the data memory 150, via the system bus 200 (step 508). If necessary, the CPU 113 creates then boundary data of the divided image data 2, sets anew these boundary data as part of the process A parameters, and writes the data back to the process A program storage region 153 of the data memory 150.

FIG. 11F illustrates the state of the data memory 150 at this time. The next image data begin to accumulate again in the input data storage region 151 The image data in the after-process data storage region 152 are rewritten with the divided image data 2 after the process A. The process A program 181 and the process A parameters are written back to the process A program storage region 153, and the process A parameters are rewritten with the boundary data of the divided data 2. The process B program storage region 154 and the process C program storage region 155 remain as in FIG. 11E.

Next, the controller 170 reads the process B program 182 and the process B parameters from the process B program storage region 154 of the data memory 150, and transfers them to the data processing unit 110 via the system bus 200 using a DMA scheme (step 504). The controller 170 reads then from the after-process data storage region 152 of the data memory 150 the divided image data 2 after the process A, and, likewise, transfers the data to the data processing unit 110 via the system bus 200 using a DMA scheme (step 505).

In the data processing unit 110, the process B program 182 and the process B parameters are stored in the process program memory region 111, and the divided image data 2 after the process A are stored in the data memory region 112. The CPU 113 of the data processing unit 110 executes on the divided image data 2 after the process A of the data memory region 112 a desired process B (for instance, likewise, MTF filtering, gamma conversion or the like), on the basis of the process B program 182 and the process B parameters of the process program memory region 111 (step 506); when the boundary data of the divided image data 1 after the process A are inserted in the process B parameters, the process B is then executed for instance joining the image data of the boundary data to the head of the divided image data 2 after the process A of the data memory region 112, or referring to the boundary data. The divided image data 2 after the process B are written back, together with the data header, to the after-process data storage region 152 of the data memory 150 via the system bus 200 (step 507). Once the writeback of the divided image data 2 after the process A is completed, the CPU 113 writes back the process B program 182 and the process B parameters of the process program memory region 111 to the process B program storage region 154 of the data memory 150, via the system bus 200 (step 508). If necessary, the CPU 113 creates then boundary data of the divided image data 2 after the process A, sets these boundary data as part of the process parameters of the process B program 182, and writes the data back to the process B program storage region 154 of the data memory 150.

FIG. 11G illustrates the state of the data memory 150 at this time. The image data from the data input unit 120 continue accumulating with overwriting in the input data storage region 151. The image data in the after-process data storage region 152 are rewritten with the divided image data 2 after the process B. The process B program 182 and the process B parameters are written back to the process B program storage region 154, and the process B parameters are rewritten with the boundary data of the divided data 2 after the process A. The process A program storage region 153 remains as in FIG. 11F, while the process C program storage region 155 continues as in FIG. 11E.

Next, the controller 170 reads the process C program 183 and the process C parameters from the process C program storage region 155 of the data memory 150, and transfers them to the data processing unit 110 via the system bus 200 using a DMA scheme (step 504). The controller 170 reads then from the after-process data storage region 152 of the data memory 150 the divided image data 2 after the process B, and, likewise, transfers the data to the data processing unit 110 via the system bus 200 using a DMA scheme (step 505).

In the data processing unit 110, the process C program 183 and the process C parameters are stored in the process program memory region 111, and the divided image data 2 after the process B are stored in the data memory region 112. The CPU 113 of the data processing unit 110 executes on the divided image data 2 after the process B of the data memory region 112 a desired process C (likewise, gradation processing or the like), on the basis of the process C program 183 and the process C parameters of the process program memory region 111 (step 506); herein also, when the boundary data of the divided image data 1 after the process B are contained in the process C parameters, the process C is then executed, for instance, joining the image data of the boundary data to the head of the divided image data 2 after the process B of the data memory region 112, or referring to the 10 boundary data. The divided image data 2 after the process C are written back to the after-process data storage region 152 of the data memory 150 via the system bus 200 (step 507). Once the writeback of the divided image data 2 after the process C is completed, the CPU 113 writes back the process C program 183 and the process C parameters of the process program memory region 111 to the process C program storage region 155 of the data memory 150, via the system bus 200 (step 508). If necessary, the CPU 113 creates then boundary data of the divided image data 2 after the process B, sets these boundary data as part of the process C parameters, and writes the data back to the process C program storage region 155 of the data memory 150.

FIG. 11H illustrates the state of the data memory 150 at this time. Again, the next image data to be processed (divided image data 3) accumulate substantially in the input data storage region 151. The image data in the after-process data storage region 152 are rewritten with the divided image data 2 after the process C. The process C program 183 and the process C parameters are written back to the process C program storage region 155, and the process C parameters are rewritten with the boundary data of the divided data 2 after the process B. The process A program storage region 153 continues as in FIG. 11F, while the process B program storage region 154 remains as in FIG. 11G.

Once the processes A through C are over for the divided image data 2 as the initial process unit (step 509), the controller 170 or the control CPU 190 reads from the after-process data storage region 152 of the data memory 150 the divided image data 2 after the process C, and outputs these data to the data output unit 130 via the system bus 200 (step 510).

Hereafter, the processes A through C are executed in sequence, with the respective divided image data as process units, and the output operation is repeated sequentially, all the processes being ended when the data after the C process corresponding to the last divided image data are outputted (step 511).

Figure 12:
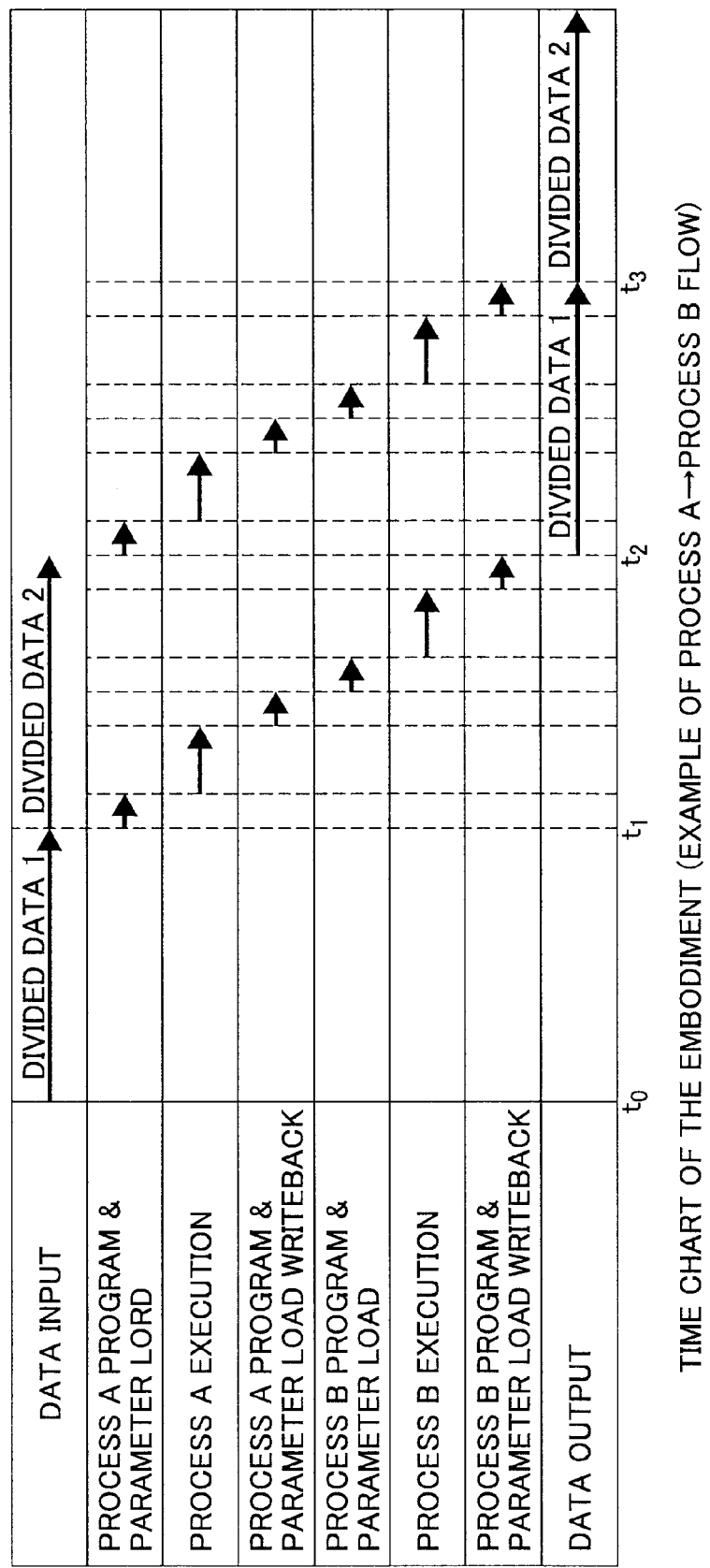
FIG. 12 is a diagram illustrating an example of a time chart of the embodiment.

FIG. 12 illustrates an example of a time chart of the present embodiment. In FIG. 12, for simplicity, the input data to be processed are processed by being divided in two, as divided data 1 and divided data 2, while processing involves just two processes, process A and process B.

Data input begins at the instant $t_0$ at instant $t_1$ the divided data 1 of the initial process unit finish being inputted; between the instant $t_1$ and an instant $t_2$ the divided data 1 are subjected sequentially to process A and process B (Multi Round Image Processing); between the instant $t_2$ and an instant $t_3$ are outputted the divided data 1 after processing. Data input continues also from the instant $t_1$ onwards; at instant $t_2$ the divided data 2 of the next process unit finish being inputted; between the instant $t_2$ and an instant $t_3$ the divided data 2 are subjected sequentially to process A and process B in parallel with the output operation of the divided data 1; and between the instant $t_3$ and an instant $t_4$ are outputted the divided data 2 after processing.

As illustrated in FIG. 12, plurally dividing input image data and treating the respective divided image data as process units allows performing in parallel an input operation, a processing operation, and an output operation, which in turn allows downscaling hardware resources such as memory or the like in the data memory 150 and/or the data processing unit 110, while shortening also the overall processing time.

FIG. 12 illustrates the most ideal case, in which, for instance, when the next divided data 2 are inputted only halfway through a process at instant $t_2$, the process waits until all the divided data 2 are inputted, and initiates then the processing thereof.

Following the above explanation of an embodiment of the present invention, it is evident that the invention is in no way limited to the above-described embodiment. As has been explained, the processed programs may be more than one, and process parameters may be unnecessary depending on the program, while setting of boundary data in the parameters may be unnecessary depending on process type. Also, although it involves a somewhat longer processing time, the entirety of the image data to be processed may become accumulated in the data memory, after which the image data to be processed may be processed in desired process units (multi round processing). The data to be processed may be inputted through the external I/F 140, while the data after processing may be outputted again through the external I/F 140, or, alternatively, may be accumulated in the mass storage unit 160.

In the present invention, thus, a data processing unit need only possess a program memory region sufficient for storing one process program and process parameters, and a data memory region sufficient for storing divided image data of a process unit. This allows curbing dramatically increased memory requirements and achieving lower overall costs. If needed, also, plural arbitrary process programs may be executed in a multi-round fashion in the processing unit, securing thereby programming freedom. The increase in capacity of the image data storing unit can also be curbed by processing data as divided image data.

Plurally dividing the image data to be processed, with the respective divided image data treated as process units, allows carrying out in parallel the input operation of the image data to be processed, the series of processing operations in the data processing unit, and the output operation of the image data after being processed, all of which allows shortening the overall processing time. Upon writeback of the process programs and the process parameters thereof to the storage unit, also, fault-free processing can be carried out across boundaries between divided image data by setting boundary data in the process parameters. Upon writeback of the image data after processing to the storage unit, moreover, appending to the image data the information to be passed on to the next process program allows easily passing on necessary information between process programs when sequentially executing plural process programs on the divided image data.

Various modifications will become possible for those skilled in the art after receiving the teachings of the present disclosure, without departing from the scope thereof.

What is claimed is:

1. An image processing device comprising:
a programmable data processing unit;
an image data storing unit; and
a process program storage unit, wherein
the data processing unit repeats
dividing and reading image data from the image data storage unit,
reading the process program from the process program storage unit,
executing the read process program on the read image data,
returning the image data after processing to the image data storage unit, and
returning the process program after execution to the program storage unit, for each divided image data,
the data processing unit uses processing data of preceding divided image data during processing of subsequently processed divided image data, and
the image processing device further comprises,
a storage unit for parameters corresponding to the process program, wherein
upon reading the process program, the data processing unit reads corresponding parameters from the storage unit for parameters, executes the process program on the image data using the parameters,
upon returning the process program to the program storage unit, returns the parameters to the parameter storage unit, and
upon returning the parameters to the parameter storage unit, the data processing unit appends to the parameters boundary data of the divided image data processed by the process program and returns the parameters, and upon executing the process program, uses the boundary data appended to the parameters.

2. The image processing device as claimed in claim 1, further comprising a control unit to control an input operation of inputting image data to the image data storage unit, a processing operation of the data processing unit, and an output operation of outputting from the image data storage unit image data after processing.

3. The image processing device as claimed in claim 2, wherein the control unit performs control overlapping the input operation, the processing operation and the output operation, for each divided image data.

4. An image processing device comprising:
a programmable data processing unit;
an image data storing unit; and
a storage unit to store plural process programs, wherein
the programmable data processing unit repeats
a first process including,
dividing and reading the image data from the image data storage unit,
reading a first process program from the process program storage unit,
executing the read first process program on the divided and read image data,
returning the image data after processing to the image data storage unit, and
returning the first process program after execution to the program storage unit,
and a second process of sequentially repeating for each process program existing in the program storage unit a process including,
reading from the image data storage unit the image data after processing,
reading from the process program storage unit a next process program,
executing the read process program on the read image data,
returning the image data after processing to the image data storage unit, and returning the process program after execution to the program storage unit, the first and second processing being repeated for each divided image data, the programmable data processing unit uses processing data of preceding divided image data during processing of subsequently processed divided image data, and the image processing device further comprises, a storage unit for parameters corresponding to the process program, wherein upon reading the process program, the data processing unit reads corresponding parameters from the storage unit for parameters, executes the process program on the image data using the parameters, and upon returning the process program to the program storage unit, returns the parameters to the parameter storage unit, and upon returning the parameters to the storage unit for parameters, the data processing unit appends to the parameters boundary data of the divided image data processed by the process program and returns the parameters, and upon executing the process program on the next divided image data, uses the boundary data appended to the parameters.

5. The image processing device as claimed in claim 4, wherein the data processing unit, upon returning the image data after processing to the image data storage unit, returns the image data appending thereto information passed on to a next process program, and upon executing a next process program on the image data, uses the information appended to the image data.

6. The image processing device as claimed in claim 4, further comprising control means for controlling an input operation of inputting image data to the image data storage unit, a processing operation of the data processing unit, and an output operation of outputting from the image data storage unit image data after processing.

7. The image processing device as claimed in claim 6, wherein the control means controls overlapping the input operation, the processing operation and the output operation, for each divided image data.

8. An image processing control method in an image processing device having a programmable data processing unit, an image data storing unit, and a process program storage unit, the method including steps comprising:

dividing image data stored in the image data storage unit and loading the image data into the data processing unit;

reading the process program stored in the process program storage unit and loading the process program into the data processing unit;

executing, in the data processing unit, the loaded process program on the divided and loaded image data;

returning image data processed in the data processing unit to the image data storage unit; and returning the process program executed in the data processing unit to the process program storage unit, wherein each of the steps is repeated for each divided image data, and executing the loaded process program includes using processing data of preceding divided image data during processing of subsequently processed divided image data the method further comprising, reading corresponding parameters from a storage unit for parameters in the loading the process program into the data processing unit, executing the process program using the read parameters in the executing in the data processing unit the process program for the image data, and returning the corresponding parameters to the storage unit for parameters in the returning the executed process program to the process program storage unit, wherein upon returning again the parameters to the storage unit for parameters, the parameters are returned appending thereto boundary data of the divided image data to be processed by the process program, and the boundary data appended to the parameters corresponding to the relevant process program are used upon executing the process program, in the data processing unit, on the next divided image data.

9. The image processing control method as claimed in claim 8, further comprising:

inputting image data to the image data storage unit; and outputting from the image data storage unit image data after processing.

10. The image processing control method as claimed in claim 9, wherein the image data input step, the process step in the data processing unit and the output step of image data after processing are carried out with overlapping.

11. An image processing control method in an image processing device having a programmable data processing unit, an image data storing unit, and a storage unit of plural process programs, the method including steps comprising:

carrying out a first step including, dividing image data from the image data storage unit and loading the image data into the data processing unit;

loading to the data processing unit a first process program from the process program storage unit;

executing in the data processing unit the loaded first process program on the divided and read image data;

returning the image data after processing to the image data storage unit; and returning the executed first process program to the process program storage unit; and carrying out a second step of sequentially repeating for each process program existing in the process program storage unit including, loading to the data processing unit the image data after processing from the image data storage unit;

reading a next process program from the process program storage unit;

executing in the data processing unit the loaded process program on the read image data;

returning the image data after processing to the image data storage unit; and returning the executed process program to the process program storage unit, the first step and the second step being repeated for each divided image data, and the executing the loaded first process program and the executing the loaded process program including using processing data of preceding divided image data during processing of subsequently processed divided image data, the method further comprising, reading corresponding parameters from a storage unit for parameters in the loading the process program into the data processing unit, executing the process program using the read parameters in the executing in the data processing unit the process program for the image data, and returning the corresponding parameters to the storage unit for parameters in the returning the executed process program to the process program storage unit, wherein upon returning again the parameters to the storage unit for parameters, the parameters are returned appending thereto boundary data of the divided image data to be processed by the process program, and the boundary data appended to the parameters corresponding to the process program are used upon executing the process program, in the data processing unit, on the next divided image data.

12. The image processing control method as claimed in claim 11, wherein in the returning again the image data after processing to the image data storage unit, the image data are returned appending thereto information passed on to a next process program, the information appended to the image data being used in the executing in the data processing unit the next process program on the image data.

13. The image processing control method as claimed in claim 11, further comprising:

inputting image data to the image data storage unit;

and outputting from the image data storage unit image data after processing.

14. The image processing control method as claimed in claim 13, wherein the image data input step, the process step in the data processing unit and the output step of image data after processing are carried out with overlapping.

* * * * *

UNITED STATES PATENT AND TRADEMARK OFFICE
CERTIFICATE OF CORRECTION

PATENT NO. : 7,945,125 B2
APPLICATION NO. : 11/621798
DATED : May 17, 2011
INVENTOR(S) : Takeharu Tone It is certified that error appears in the above-identified patent and that said Letters Patent is hereby corrected as shown below:

On the title page, Item (30), the Foreign Application Priority Data has been omitted. Item (30) should read:

-- (30)     Foreign Application Priority Data

Jan. 12, 2006    (JP)    .................................. 2006-004365 --

Signed and Sealed this
Fifth Day of July, 2011

David J. Kappos
*Director of the United States Patent and Trademark Office*